Nov. 1, 1949     R. E. GEBHARDT     2,486,742
PRESSURE SWITCHING APPARATUS
Filed Dec. 27, 1944
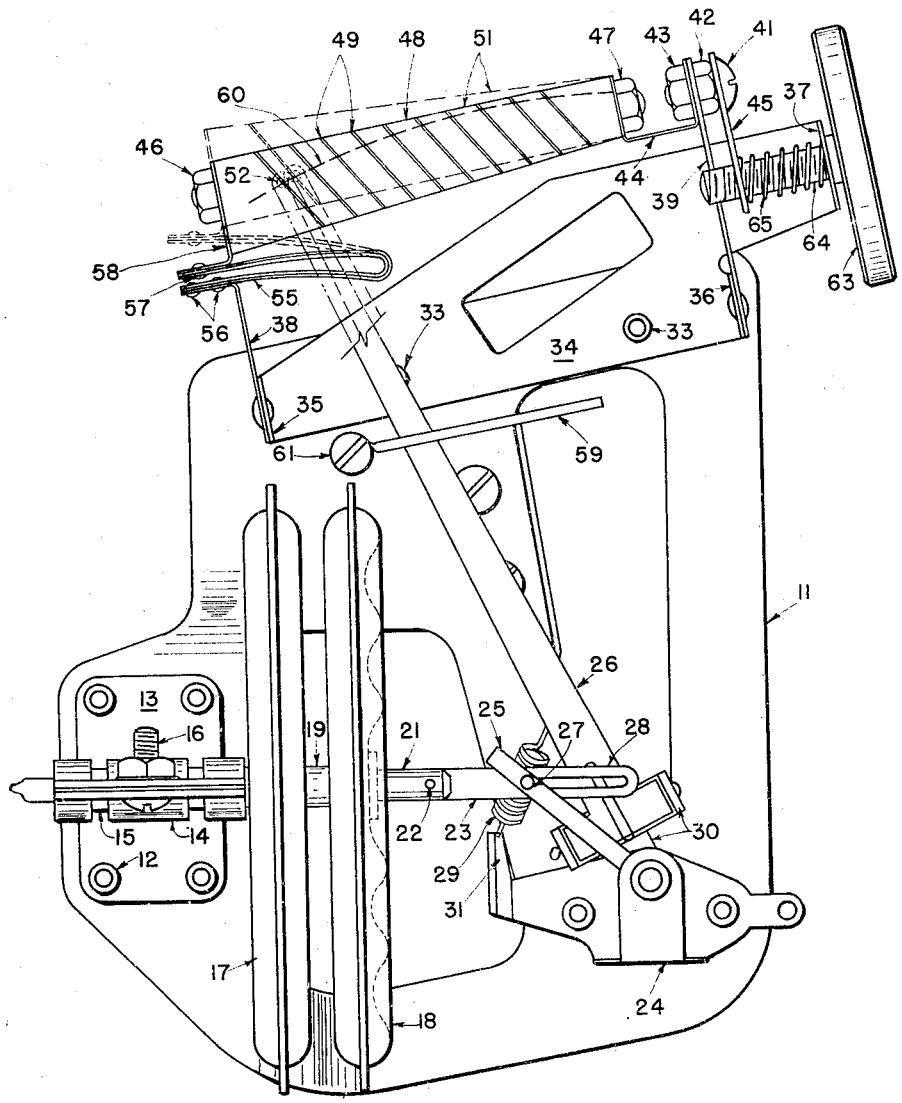
*INVENTOR.*
ROBERT E. GEBHARDT
BY Ray D Bateman
*ATTORNEY*

Patented Nov. 1, 1949

2,486,742

UNITED STATES PATENT OFFICE 2,486,742

PRESSURE SWITCHING APPARATUS

Robert E. Gebhardt, Arlington, Va., assignor to Bendix Aviation Corporation, South Bend, Ind., a corporation of Delaware Application December 27, 1944, Serial No. 570,015

15 Claims. (Cl. 200—83)

The present invention relates to pressure switching apparatus, and more particularly to switches for use in radiosondes, in which barometric pressures are utilized to automatically effect switching operations during ascent and descent of the radiosonde.

It has been found that the physical properties of the aneroid or bellows unit of such devices undergo changes in response to temperature changes, which introduce errors into the switching operations performed thereby. The aneroids are usually exhausted to a high degree, which causes their opposite walls to be pulled substantially out of the plane of their peripheries, and it has been discovered that with the aneroid in this condition, i. e. at substantially sea level or maximum atmospheric pressure, the temperature error is greatest and decreases with decreases in pressure until at extremely low pressures, with the bellows unstressed or relaxed, the error is practically negligible.

In the copending application of W. L. W. Ogden and W. R. Ryan, Serial No. 551,699, filed August 29, 1944, for "Pressure switch," now Patent No. 2,437,473, granted March 9, 1948, there is disclosed a pressure switch embodying a bimetal member in the actuating train between the aneroid and the switch arm, which is operable to compensate for temperature changes throughout the pressure range. The present invention deals with a device in which temperature compensation is effected in a somewhat different manner. I have found that by disposing the commutator or switch segments at an acute angle with respect to the switch block axis, and mounting the switch block for limited pivotal movement about an axis located adjacent one of its ends, and causing the switch block to automatically pivot to predetermined degrees in response to temperature changes, so as to cause the switch arm to follow different trajectories over the switch block at different temperatures, a barometric switch is provided which will accurately perform its pressure-switching functions regardless of the temperatures to which it is subjected.

It is accordingly the major object of this invention to provide a novel pressure switching device embodying a switch block which is so designed, and has temperature responsive mechanism for so shifting it in response to temperature changes, that it will accurately carry out its pressure switching functions independently of the temperatures to which it is subjected.

Another important object is to provide a novel pressure switching apparatus having a switch block pivoted adjacent one end, and embodying inclined commutator segments and an aneroid and thermo-responsive means for causing the switch arm and block to move relatively to each other in response to pressure and temperature changes in such manner as to reflect the correct pressure and compensate for any temperature induced forces which may be in the aneroid unit.

A further object is to provide an aneroid actuated switching unit with a novel thermostatically displaceable switch block assembly having inclined commutator segments and being operable to effect relatively large temperature connections at high barometric pressures and to make progressively smaller corrections as the pressure decreases.

Further objects will become apparent as the specification proceeds in conjunction with the annexed drawings, and from the appended claims.

Referring to the drawing, the single figure illustrates in plan view a pressure switch embodying the invention.

The aneroid and switch arm parts are supported on an appropriately shaped base member 11. Secured to base 11, by rivets 12 or the like, is an upstanding bracket 13, having a clamping portion 14 in which the tube 15 of the aneroid assembly is rigidly clamped by a screw and nut assembly 16. In the switch chosen for illustration, the aneroid is made up of a pair of bellows units 17 and 18, connected together by a stud 19. The bellows units 17 and 18, because of inherent physical properties, undergo changes in response to temperature changes under conditions of constant pressure. The bellows units utilized in the device of the present invention expand with decreases in temperature. Thus, under constant pressure conditions, a sudden drop in temperature, below the temperature for which the instrument is calibrated, causes the bellows unit to expand and thus indicate a pressure that does not correspond to the constant pressure to which the bellows unit is actually subjected. Compensating means, which will be hereinafter described in detail, are necessarily provided to assure that the bellows unit at all times, under conditions of constant pressure and ambient temperature, give a true indication of the pressure conditions exterior to the bellows unit. Tube 15 is utilized to seal off the bellows in well known manner and also supports the bellows assembly upon the base. Secured to the front face of bellows 18 is a stud 21, to which a link 23 is pivotally connected at 22. Rigidly connected to a shaft journaled in an upright standard 24 secured to the base, is a lever 25 and a switch arm 26, the parts being interconnected by pin 27 riding in a slot 28 in link 23. The switch arm has an enlarged inner end which is pivotally connected to a support 30 rigidly carried by the shaft. A spring 29, anchored to an ear 31 provided on standard 24, is connected to switch arm 26 and is so biased as to urge the arm towards zero position and to also force it downwardly, about its hinge point as an axis, into engagement with the switch block or commutator, which will now be described.

Secured to frame 11 by rivets 33 or the like is a subframe member 34 having upturned portions or ears 35, 36 and 37. Secured to ears 35 and 36 are a pair of flexible supports 38 and 39 respectively. Secured to support 39, as for instance by means of a screw 41 and a pair of nuts 42 and 43, is a U-shaped hinge member 44 and a relatively stiff adjusting member 45. Secured to hinge member 44, by means of a long screw 46 and nut 47, is a commutator or switch body 48 made up of inclined conductive segments 49 and insulating segments 51. The conductive segments and the switch arm are adapted to be connected to the radiosonde in well-known manner (not shown).

Switch arm 26 carries a contact 52 at its free end, and it is adapted to ride over the edges of the conducting and insulating segments in response to actuation of the switch arm by the bellows, and to open and close certain circuits in accordance with the barometric pressure.

By inclining the commutator segments in the manner illustrated, and by providing a thermostatic device of the character that will now be set forth, for displacing the switch block in response to temperature changes, I have found that it is possible to provide a pressure switch which will overcome all of the disadvantages previously mentioned, and to substantially exactly compensate for the undesirable behavior of the bellows in response to temperature changes.

While any suitable type of thermostatic means may be employed for pivoting the switch block about its hinge 44 in response to temperature changes, so long as the rate of travel is properly coordinated with the inclination of conducting segments 49 and the physical properties of the bellows of the switch to which the invention is applied, I have disclosed a simple bimetal element 55 anchored at one end to support 38 by rivets 56, and secured by a sliding rivet and slot connection 57 to a support element 58 secured under the head of screw 46. In the bimetal construction shown, the active element is placed outside, and the inert element is placed inside of the U, so that member 55 will expand and move into the dotted line position when extremely low temperatures are encountered.

Taking up the operation of the device, the line designated 60 represents the trajectory of contact 52 over the segments when the switch block is disposed in the full line position shown, and which corresponds to "normal" temperatures. Assuming now that the pressure remains constant but the temperature drops materially, due to the inherent thermal characteristics of the bellows, previously mentioned, arm 26 will assume the dotted line position, thereby moving up on the switch block. This would result in an erroneous pressure indication (i. e. lower than actual pressure) if it were not for the fact that bimetal 55, at such lowered temperature, pivots the switch block outwardly into the dotted line position. This action, together with the fact that segments 49 are inclined, causes the device to compensate for the bellows error, because, as seen, the dotted line position of contact 52 coincides with the dotted line position of segment 49, on which it rested at "normal" temperature. Hence, the device will indicate the proper pressure at the lowered temperature. Since the switch block is pivoted at the "low pressure" end, it is apparent that the compensating action will become progressively smaller as the pressures decrease, until, at extremely low pressures, with the bellows substantially fully expanded, the action becomes very small. This decreasing compensating action is in accordance with the observed behavior of bellows units in response to temperature changes, and enables the device to fully compensate for such behavior.

Accordingly, by pivoting the switch block about one end in response to temperature changes, and inclining the switch segments the proper degree to compensate for the bellows error due to such changes, a pressure switch is provided which will carry out pressure switching operations in which any error-producing thermally induced action in the bellows is fully compensated for, enabling accurate switching to be achieved at all temperatures and pressures.

When the switch is not in use arm 26 is supported on a bracket 59 secured to base 11 by a screw 61, slot 28 providing sufficient lost-motion to permit it to be swung out and lifted onto the bracket without rocking arm 25.

The device is adapted to set at "zero," for instance at the ground barometric pressure prior to releasing the radiosonde, by means of a knob 63 carrying a screw 64, which is journaled in ear 37 of the base and is threaded into member 45 carried by the switch block assembly. A compression spring 65, bearing against ear 37 and member 45 maintains knob 63 in tight engagement with ear 37 at all times and eliminates lost-motion. Screw 64 is offset above support 39, so as to eliminate mechanical interference.

From the foregoing it is apparent that by rotating knob 63, screw 64 may be threaded into or out of member 45, so as to cause the switch block to be bodily shifted to the right or left, to secure the desired calibration, supports 38 and 39 flexing sufficiently to permit this action to take place, and bimetal 55 being sufficiently stiff to maintain the parts in the proper relationship.

While I have disclosed an assembly in which the switch pivots outwardly in response to decreases in temperature, it is to be understood that if desired the parts may be reversed so as to pivot the switch inwardly in response to decreases in temperature and segments 49 inclined oppositely to the direction shown to a degree sufficient to effect proper compensation, and the appended claims are intended to embrace the invention when it assumes that form.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent, is:

1. In a pressure switching apparatus, a switch block comprising an elongated commutator having conducting and insulating segments; a switch arm pivoted for travel from one end of the commutator to the other; a pressure operated device for actuating said arm in response to pressure changes and also being operable to undergo actuation in response to temperature variations; and means, including means for automatically pivoting said switch block about an axis located adjacent one end thereof in response to temperature changes, for automatically introducing a compensation into the switching action of sufficient magnitude to compensate for said temperature induced actuation of said pressure responsive device.

2. In a pressure switching apparatus, a commutator; a switch arm movable over said commutator for effecting a switching action; a pressure responsive device for actuating said arm, said commutator comprising an elongated body made up of conducting and insulating segments, said conducting segments being inclined at a predetermined angle with respect to the longitudinal axis of said body; and means for automatically pivoting said body about an axis located adjacent one end thereof in response to temperature changes through angles sufficiently great to cause said switch arm to coact with said inclined segments in such manner to effect a temperature compensated switching action at all temperatures and pressures within the range of the apparatus.

3. In a pressure switching apparatus, a switch block assembly comprising conducting and insulating segments; a switch arm mounted for pivotal movement and carrying a contact adapted to ride over said segments when said arm undergoes pivotal movement, a bellows device connected to said arm, and operable to actuate said arm in response to pressure changes, said bellows device also being operable to produce actuations of said arm in response to temperature variations; and compensating means, including means for shifting said switch block assembly automatically in response to temperature changes, for compensating for temperature-variation-induced actuation of said arm by said bellows, whereby switching is effected solely in accordance with pressure changes.

4. The pressure switching apparatus defined in claim 3, wherein said bellows device is operable to produce positive actuations of said arm in response to temperature decreases, and said compensating means is operable to produce a negative actuation sufficient to balance such positive actuation.

5. In a pressure switching apparatus, a supporting structure; a bellow unit carried by said supporting structure; a contact carrying arm mounted for pivotal movement on said base and operatively connected to said bellows unit, said bellows unit being operable to swing said arm through predetermined angular distances in response to predetermined decreases in pressure, and also being operable to swing said arm through longer angular distances when the temperature is decreased incident to such decreases in pressure; a commutator cooperating with said contact arm and having segments adapated to be engaged by said contact, said segments being inclined with respect to radii passing through the axis of said arm; and compensating means for automatically shifting said commutator in response to temperature changes in such manner as to cause the switching action of said arm to reflect only the pressure-induced action of said bellows unit.

6. The apparatus defined in claim 5, wherein said commutator means is operable to shift said commutator about an axis located adjacent one end thereof, whereby greater compensation is effected at one end of the commutator than the other.

7. The switching apparatus defined in claim 5, wherein means are also provided for bodily shifting said commutator and said compensating means endwise with respect to said supporting structure, for adjusting the pressures at which said contact will engage said segments.

8. In a pressure switch, a base structure; a pressure actuated arm pivotally mounted on said base structure; an elongated switch block; means mounting said switch block in cooperating relationship with said switch arm and operable to undergo movement transversely of its axis, so as to cause said contact arm to describe different paths over said block, in accordance with the shifted position of the latter; and means for automatically shifting said switch block in response to temperature changes.

9. The pressure switch defined in claim 8, wherein said switch block is mounted for pivotal movement in a plane parallel to the pivoting plane of said contact arm.

10. The pressure switch defined in claim 8, wherein said last-named means comprises a thermostatic device anchored to said base structure and operably connected to said switch block.

11. In switching apparatus, a first element including a plurality of spaced contact members, a driving element responsive to variations in a measured condition and having a motion modulus varying with changes in a second condition, a contact movable over a predetermined path adjacent said first element in response to the action of said driving element, and means acting on said first element responsive to said second condition for varying the mutual separation between said plurality of spaced contact members measured along said path.

12. In switching apparatus, a first element including a plurality of spaced contact members, a driving element responsive to variations in a measured condition and having a motion modulus varying with changes in a second condition, a contact movable over a predetermined path adjacent said first element in response to the action of said driving element, and means responsive to said second condition for rotating said first element about an axis substantially perpendicular to said path.

13. In switching apparatus, a first element including a plurality of spaced contact members, a driving element responsive to variations in a measured condition having a motion modulus varying with changes in a second condition and characterized by a lack of motional response to changes in said second condition when subjected to a predetermined level of said measured condition, a contact movable over a predetermined path adjacent said first element in response to the action of said driving element and located at a reference point on said path when said driving element is subjected to said predetermined level of said measured condition, and means responsive to said second condition for rotating said first element about an axis substantially perpendicular to said axis and passing substantially through said reference point.

14. In switching apparatus, a first element including a plurality of spaced contact members, a driving element responsive to variations in a measured condition having a motion modulus increasing with changes in a second condition in a predetermined sense, a contact movable over a predetermined path adjacent said first element in response to the action of said driving element, the edges of said contact members forming an acute angle with said path, and means for rotating said first element in response to changes of said predetermined sense in said second condition in a direction making said acute angle smaller.

15. In switching apparatus, a first element including a plurality of spaced contact members, a driving element responsive to variations in a measured condition and having a motion modulus varying with changes in a second condition, a contact driven by said driving element through a mechanical linkage having a mechanical magnification, said contact being movable over a predetermined path adjacent said first element in response to the action of said driving element, and means responsive to said second condition for varying the separation between said contact members measured along said path, said last named means being independent of the mechanical magnification of said mechanical linkage.

ROBERT E. GEBHARDT.

REFERENCES CITED

The following references are of record in the file of this patent:

UNITED STATES PATENTS

| Number | Name | Date |
|---|---|---|
| 1,798,216 | Newell et al. | Mar. 21, 1931 |
| 2,025,097 | Dougherty | Dec. 24, 1935 |
| 2,032,041 | Beck | Feb. 25, 1936 |
| 2,178,799 | Loen | Nov. 7, 1939 |
| 2,315,137 | Shaw | Mar. 30, 1943 |
| 2,367,034 | McCabe | Jan. 9, 1945 |